United States Patent [19]

Kachlova et al.

[11] 3,846,338

[45] Nov. 5, 1974

[54] METHOD FOR PRODUCING PHOSPHATE CATALYST

[76] Inventors: Revekka Vulfovna Kachlova, ulitsa Krylenko, 5, kv. 194; Mark Semenovich Nemtsov, ulitsa Gagarina, 21, kv. 8; Galina Fedorovna Balkhanova, ulitsa Telmana, 48, korpus 3, kv. 60; Ljudmila Nikolaevna Bychkovskaya, 11 Krasnoarmeiskaya ulitsa, 6, kv. 10; Vera Mikhailovna Mescherskaya, kanal Griboedova, 111, kv. 1; Sofya Petrovna Rabinovich, Bolshoi prospekt, 12, kv. 9, all of Leningrad, U.S.S.R.

[22] Filed: July 21, 1972

[21] Appl. No.: 273,958

[52] U.S. Cl. ............................ 252/437, 260/681
[51] Int. Cl. .............................. B01j 11/82
[58] Field of Search ............ 252/437, 435; 260/681

[56] References Cited
UNITED STATES PATENTS

| | | | |
|---|---|---|---|
| 2,847,476 | 8/1958 | Steadman | 252/437 X |
| 2,977,396 | 3/1961 | Stanley et al. | 260/681 |
| 3,122,588 | 2/1964 | Phillips et al. | 252/437 X |
| 3,562,350 | 2/1971 | Juguin et al. | 252/435 X |
| 3,567,757 | 3/1971 | Ida et al. | 252/437 X |
| 3,657,376 | 4/1972 | Stuebinger et al. | 260/681 |

*Primary Examiner*—Patrick P. Garvin
*Attorney, Agent, or Firm*—Waters, Roditi, Schwartz & Nissen

[57] ABSTRACT

A method for producing a catalyst on the basis of phosphates of metals belonging to Group II for selective rupturing of

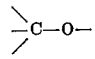

bonds in organic compounds, and, in particular, for splitting 4,4-dimethyl-1,3-dioxane into isoprene, by thermal passivation of phosphates of metals belonging to Group II, at temperatures within the range of 550° to 700°C in an atmosphere of superheated steam or of mixtures thereof with air or with an inert gas.

6 Claims, No Drawings

METHOD FOR PRODUCING PHOSPHATE CATALYST

The present invention relates to the production of isoprene from isobutylene and formaldehyde, and more particularly to the methods for producing a phosphate catalyst for selective rupturing of the

bond in organic compounds, in particular for splitting 4,4-dimethyl-1,3-dioxane, further referred to as DMD, into isoprene.

The commonly known methods for producing phosphate catalysts for splitting DMD into isoprene are based on the method of precipitating phosphates from aqueous solutions of phosphoric acid salts of metals belonging to Group II, preferably of calcium and cadmium.

In particular, industrial application has been found for calcium phosphates, with or without the addition of cadmium.

However, the known catalysts of this type do not ensure sufficiently high selectivity of the process of splitting DMD.

The most serious technological problems in using these catalysts for the purpose of splitting DMD into isoprene are connected with the formation of carbonaceous decomposition products which block the active surface of the catalyst. The latter phenomenon, which manifests itself especially drastically during the initial period when freshly loaded catalysts are put to work, results not only in the isoprene yield dropping a few percent, but also in the periodic oxidative regeneration process becoming considerably longer (12 hours, or more), thus disturbing the proper operation time intervals of the individual reactors in the system and necessitating the installation of stand-by-reactors.

Another disadvantage of these catalysts also stemming from the increased carbon-formation is a relatively short life of the catalyst, which usually does not exceed 3 hours, whereupon a prolonged regeneration of the catalyst is required. Finally, insufficient selectivity of the known catalysts manifests itself in the formation of free hydrogen due to formaldehyde decomposition, which hydrogen hydrogenates isoprene to form isopentene. The latter may partially condense with formaldehyde into hexadienes and their derivatives.

As a result of the processes described above, the yield of the desired product - isoprene, is markedly reduced.

It is an object of this invention to provide a method for the production of a phosphate catalyst to be used for splitting DMD into isoprene, ensuring higher process selectivity, and, particularly, preventing excessive carbon deposition on the active surface of the catalyst.

These and other objects were attained by using the present invention, the essence of which will be clear from the following description.

A method for producing a phosphate catalyst for splitting DMD into isoprene according to the present invention consists in thermal passivation of phosphates of metals belonging to Group II, at temperatures within the range of 550°–700°C, achieved by passing a gaseous heat carrier through said phosphate. The heat carrier can be superheated steam, or a mixture thereof with air or with an inert gas.

Such treatment results in a partial deactivation of excessively active catalytic centers, capable of intensifying said detrimental reactions. As a result, the catalyst selectivity is increased.

The investigation carried out by the authors of the present invention hs also proved that the most active, selective and mechanically strong catalysts can be obtained through thermal passivation of tertiary phosphates, analytically characterized by the molar ratio of MeO:$P_2O_5$ not lower than 2.95 (the theoretical ratio for tertiary phosphate $Me_3(PO_4)_2$ being 3.00), where Me is a metal belonging to Group II, which predetermines the presence in the phosphate of only very small quantities of acid phosphates, since said acid phosphates are unstable at the indicated passivation temperatures.

Such a tertiary phosphate can be obtained, for example, by precipitating it from aqueous solutions of salts of metals belonging to Group II, and water-soluble phosphates with the addition of ammonia which ensures the solution pH being not lower than 9.0.

The tertiary phosphate thus obtained, particularly calcium and cadmium phosphate, is subjected to thermal passivation, preferably at a temperature within 650° to 700°C, by passing superheated steam or a mixture thereof with air or with an inert gas through said tertiary phosphate.

The essence of the present invention is illustrated by the examples describing the preparation and testing of the catalysts that have been subjected to passivation under different conditions.

The initial tertiary calcium phosphate was prepared by precipitation from dilute aqueous solutions of $CaCl_2$ and $Na_2(NH_4)PO_4$ excess ammonia corresponding to pH = 9.1 in the cold. The precipitate was washed with distilled water to a chloride ion content in the wash water of 0.5 percent.

The resulting paste was shaped into noodles of 4 mm diameter, which were dried for 4 hours at 120°C.

The prepared phosphate, when analyzed, showed a molar ratio of CaO: $P_2O_5$ = 2.98, at a bulk weight of 0.70 kg/l. The clearage strength of the dried noodles was 16.1 kg/cm.

The said initial phosphate was used for preparing all the samples of passivated catalyst in the examples given hereinbelow.

The testing of the catalysts for activity and selectivity was carried out under two standardized conditions.

1. High-temperature conditions: temperature 350°C; DMD space velocity, 0.7 V/V cat. hr, with the DMD diluted with steam in a weight ratio of 1:2; and 2. low-temperature conditions: temperature, 325°C; DMD space velocity, 1.0 V/V cat. hr, with the same dilution ratio of the DMD with steam.

In both cases, in the course of the catalysis, the catalyst was continuously made-up with in phosphoric acid with quantity of 0.01 weight percent of the DMD supplied.

The conditions of passivation and the test results for both the initial non-passivated phosphate and for the passivated catalysts obtained therefrom, are presented in Table 1 (Examples 1 to 5), and Table 2 (Examples 6 to 8).

Examples 1 to 5 in Table 1 show that an increase in the passivation temperature with a slight change in its duration leads to a sharp decrease in carbon deposition on

Table 1

Catalyst Tests Results at 375°C

| Example No. | | 1 | 2 | 3 | 4 | 5 |
|---|---|---|---|---|---|---|
| Conditions of passivation* | Temperature, °C | — | 550 | 600 | 650 | 700 |
| | Duration, hrs | — | 6 | 4 | 4 | 3 |
| Degree of splitting DMD, % | | 95 | 91 | 95 | 94 | 90 |
| Yield, mol percent for converted DMD | | | | | | |
| Isoprene | | 78.2 | 79.3 | 81.9 | 83.0 | 84.9 |
| Isobutylene | | 10.2 | 11.3 | 11.0 | 11.9 | 11.8 |
| Isopentenes | | 2.6 | 2.0 | 1.2 | 0.2 | 0.2 |
| Hexadienes | | 1.3 | 1.4 | 1.3 | 1.0 | 0.7 |
| Methyldihydropyran | | 0.3 | 0.6 | 0.7 | 0.8 | 0.4 |
| Unsaturated alcohols | | 0.2 | 0.9 | 0.4 | 1.0 | 1.0 |
| High-boiling products | | 0.9 | 0.7 | 0.5 | 1.0 | 0.8 |
| Carbon on catalyst | | 6.3 | 3.8 | 3.0 | 0.9 | 0.2 |
| | Total | 100.0 | 100.0 | 100.0 | 100.0 | 100.0 |

* Passivation carried out in the atmosphere of steam.

Table 2

Catalyst Test Results at 325°C

| Example No. | | 6 | 7 | 8 |
|---|---|---|---|---|
| Conditions of passivation* | Temperature, °C | 600 | 650 | 700 |
| | Duration, hrs | 24 | 4 | 0 *** |
| Depth of splitting DMD, % | | 93 | 95 | 93 |
| Yield, mol. percent for converted DMD | | | | |
| Isoprene | | 84.9 | 84.7 | 86.5 |
| Isobutylene | | 8.7 | 8.5 | 7.9 |
| Isopentenes | | 0.1 | 0.1 | 0.1 |
| Hexadienes | | 1.6 | 1.7 | 1.0 |
| Methyldihydropyran** | | 2.6 | 2.7 | 3.3 |
| Unsaturated alcohols | | 1.1 | 1.0 | 0.3 |
| High-boiling products | | 0.6 | 0.7 | 0.6 |
| Carbon on catalyst | | 0.4 | 0.6 | 0.3 |
| | Total: | 100.0 | 100.0 | 100.0 |

*Passivation carried out in the atmosphere of steam mixed with air.
**Contains an admixture of methylenetetrahydropyran.
***Heating carried out from room temperature to 700°C, immediately followed by cooling.

the catalyst (30 times less than with a non-passivated phosphate), to a decrease in the yield of isopentenes (13 times) and hexadienes (2 times).

The yield of isoprene accordingly increases by about 10 percent. Still more favorable results are obtained when an optimal duration of passivation is selected and the process of DMD splitting is carried out at lower temperatures.

The data shown in Table 2 indicate that high catalyst activity (Examples 6 to 8) ensures, even at a temperature of 325°C, a rather high degree of splitting of both DMD (93 to 95 percent) and unsaturated alcohols, the amount of the latter in the catalyzate being practically the same as in the catalyzate obtained in the high-temperature process (see to Table 1).

These data prove the proposed catalyst to be effective for the alcohol dehydration reactions.

An important advantage of the passivated catalyst in the low-temperature process is the possibility of significantly decreasing the yield of isobutylene which forms as a by-product.

Comparative analysis of the data listed in Tables 1 and 2 also shows that selection of the required duration of passivation ensures high activity of the passivated catalyst at comparatively low temperatures as well.

However, the interrelation between the duration and the temperature of passivation depends on the method used for the preparation of the initial tertiary phosphate and, particularly, on the cations in the initial solutions.

Hence, the optimal passivation parameters for each type of the initial phosphate should be determined empirically on the basis of standard laboratory test data.

The passivation time as given in Table 2 can be recommended for tertiary calcium phosphate prepared according to the procedure outline hereinabove.

The data presented in Table 2 show that among the DMD conversion products there are present methyldihydropyran and unsaturated alcohols $C_5H_9OH$, which can be easily converted into isoprene with high yields, using the methods commonly known to those skilled in the art. Upon their reprocessing, the total yield of isoprene reaches 88 to 90 percent of the theory. If we also take into account isobutylene which, under industrial conditions, is obtained in practically pure form, the total yield of valuable products reaches 95 to 97 percent.

In addition to the basic advantages of the passivated catalyst described above, the latter is also characterized in that in contrast to the previously known catalysts for splitting DMD, its catalytic and mechanical properties remain practically unchanged from the first to the very last hour of its long service life (for 1,500 hours and more).

Whereas the known industrial-type catalyst mentioned above not only causes a strongly increased carbon-formation during the first few hundred hours of its service, but also gradually loses more than half of its initial mechanical strength, the passivated catalyst is free from this disadvantage. From the beginning to the end of its service life the clearage strength of the passivated catalyst is within 8 to 10 kg/cm.

Lower carbon-formation on the passivated catalyst during the whole period of its service life permits reduction of its oxidative regeneration time and increases the duration of its working cycle between regenerations at least two-fold (up to 6 hours or more).

What we claim is:

1. A method for producing an improved Group II metal phosphate catalyst for rupturing of

bonds in organic compounds, in particular, for splitting 4,4-dimethyl -1,3-dioxane into isoprene, and for dehydration of alcohols, which consists essentially of subjecting an initial Group II metal phosphate to thermal passivation at a temperature in the range of from 550° to 700°C., said temperature being achieved by passing through said phosphate a gaseous heat carrier selected from the group consisting of superheated steam and mixtures thereof with air or with an inert gas.

2. A method according to claim 1 wherein the phosphate is a tertiary phosphate prepared by precipitation from an aqueous solution of a Group II metal salt and of a salt of phosphoric acid at a pH not lower than 9.0.

3. A method according to claim 1 wherein the thermal passivation temperature is in the range of from 650° to 700°C.

4. A method for producing an improved Group II metal tertiary phosphate catalyst for rupturing of

bonds in organic compounds, in particular, for splitting 4,4-dimethyl -1,3-dioxane into isoprene, and for dehydration of alcohols, which consists essentially of subjecting an initial Group II metal tertiary phosphate to thermal passivation at a temperature in the range of from 550°C to 700°C, said temperature being achieved by passing through said phosphate a gaseous heat carrier selected from the group consisting of superheated steam and mixtures thereof with air or with an inert gas and said tertiary phosphate being prepared by precipitation from an aqueous solution of a Group II metal salt and of a salt of phosphoric acid at a pH not lower than 9.0.

5. A method according to claim 4 wherein the passivation temperature is in the range of from 650° to 700°C.

6. A method according to claim 4 wherein the Group II metal is selected from the group consisting of calcium and cadmium.

* * * * *